United States Patent [19]
Takada et al.

[11] 4,456,196
[45] Jun. 26, 1984

[54] SEAT BELT RETRACTOR WITH A TENSION ELIMINATOR

[75] Inventors: Juichiro Takada, Tokyo; Shuichi Ueno, Yokohama; Kazuo Isamu, Yokosuka, all of Japan

[73] Assignees: Nissan Motor Co., Ltd.; Takata Kojyo Co., Ltd., both of Japan

[21] Appl. No.: 239,140

[22] Filed: Feb. 27, 1981

[30] Foreign Application Priority Data

Mar. 7, 1980 [JP] Japan ................. 55-28077

[51] Int. Cl.³ .................. A62B 35/00; B65H 75/48
[52] U.S. Cl. ................ 242/107.6; 280/807; 297/475
[58] Field of Search ........... 242/107.6, 107.7, 107.12; 280/806, 807; 297/475–478

[56] References Cited

U.S. PATENT DOCUMENTS

| | | | |
|---|---|---|---|
| 3,700,184 | 10/1972 | Francis | 242/107.6 X |
| 3,890,003 | 6/1975 | Clase | 242/107.4 R X |
| 3,904,146 | 9/1975 | Erion | 242/107.4 R |
| 4,172,568 | 10/1979 | Yamanashi et al. | 242/107.6 |
| 4,198,011 | 4/1980 | Kamijo et al. | 242/107.7 |
| 4,199,172 | 4/1980 | Fukunaga et al. | 242/107.6 X |
| 4,228,971 | 10/1980 | Arima et al. | 242/107.6 |

FOREIGN PATENT DOCUMENTS

2723295 12/1978 Fed. Rep. of Germany.

*Primary Examiner*—John M. Jillions
*Attorney, Agent, or Firm*—Thompson, Birch, Gauthier & Samuel

[57] ABSTRACT

A seat belt retractor having a tension eliminator comprises a belt take up shaft, a return spring, a first rotatable member rotatable together with the belt take up shaft, a second rotatable member rotatable about the first rotatable member, the relative rotation between the first and second rotatable members being restricted, a spiral spring for biasing the first and second rotatable members to rotate in opposite directions, a stopper device for causing the second rotatable member to take a one-way rotatable condition, a completely locked condition and a released condition, a control device for controlling the stopper device so that when the first rotatable member rotates in one direction, the second rotatable member under the first condition is brought into the third condition and when the first rotatable member rotates in the other direction, the second rotatable member under the third condition is brought into the second condition, and a buckle switch for controlling the stopper device so that when the belt takes the seat occupant restraining position, the second rotatable member takes the first condition.

5 Claims, 9 Drawing Figures

SEAT BELT RETRACTOR WITH A TENSION ELIMINATOR

BACKGROUND OF THE INVENTION (1) Field of the Invention

The present invention relates in general to a seat belt retractor and more particularly to a seat belt retractor having a so-called tension eliminator which eliminates the belt tension applied to the belt wearer's body when the wearer assumes a normally seated position.

(2) Description of the Prior Art

A number of proposals have been made in the field of seat belt retractors to provide them with tension eliminators which function to lock the withdrawn belt when the belt assumes the seat occupant restraining position. Some of the tension eliminators are designed to complete the locking of the withdrawn belt at the instant that the buckle and the tongue member of the seat belt are coupled together. Thus, this type tension eliminator inevitably results in the belt being too loose to restrain the seated occupant because the coupling of the buckle and the tongue is made after withdrawing the belt from the retractor a sufficient amount to make the connection, which amount is too much for effective restraining. While many attempts have been made at solving this drawback, none have succeeded in doing so in a simple and economical manner.

SUMMARY OF THE INVENTION

It is therefore an object of the present invention to provide a seat belt retractor having a tension eliminator which is free of the above-mentioned drawback.

It is another object of the present invention to provide a seat belt retractor of the type mentioned above, which produces no gear noise when it is being operated to set the memory position of the belt.

It is still another object of the present invention to provide a seat belt retractor of the type mentioned above, which consumes less electric power for keeping the memory position of the belt.

According to the present invention, there is provided a seat belt retractor having a tension eliminator. The retractor comprises a housing, a belt take up shaft rotatably held in the housing for retracting thereon and withdrawing therefrom a seat belt, the shaft being biased to rotate in the direction to retract the belt; a first rotatable member rotatable about the axis of the shaft; a second rotatable member rotatable about the axis of the shaft; first means for restricting the relative rotation between the first and second rotatable members; first biasing means for biasing the first and second rotatable members to rotate in opposite directions; second means for causing the second rotatable member to take first, second and third conditions, the first condition being a condition wherein the second rotatable member is locked against rotation in only one direction, said second condition being a condition wherein the second rotatable member is locked against rotation in both directions and the third condition being a condition wherein the second rotatable member is released from being locked; third means for controlling the second means so that when the first rotatable member rotates in one direction, the second rotatable member under the first condition is brought into the third condition and when the first rotatable member rotates in the other direction; the second rotatable member under the third condition is brought into the second condition; and fourth means for controlling the second means so that when the belt takes an operative position to restrain the seated occupant, the second rotatable member takes the first condition.

BRIEF DESCRIPTION OF THE DRAWINGS

Other objects and advantages of the present invention will become clear from the following description when taken in conjunction with the accompanying drawings, in which.

DETAILED DESCRIPTION OF THE INVENTION

Figure 1:
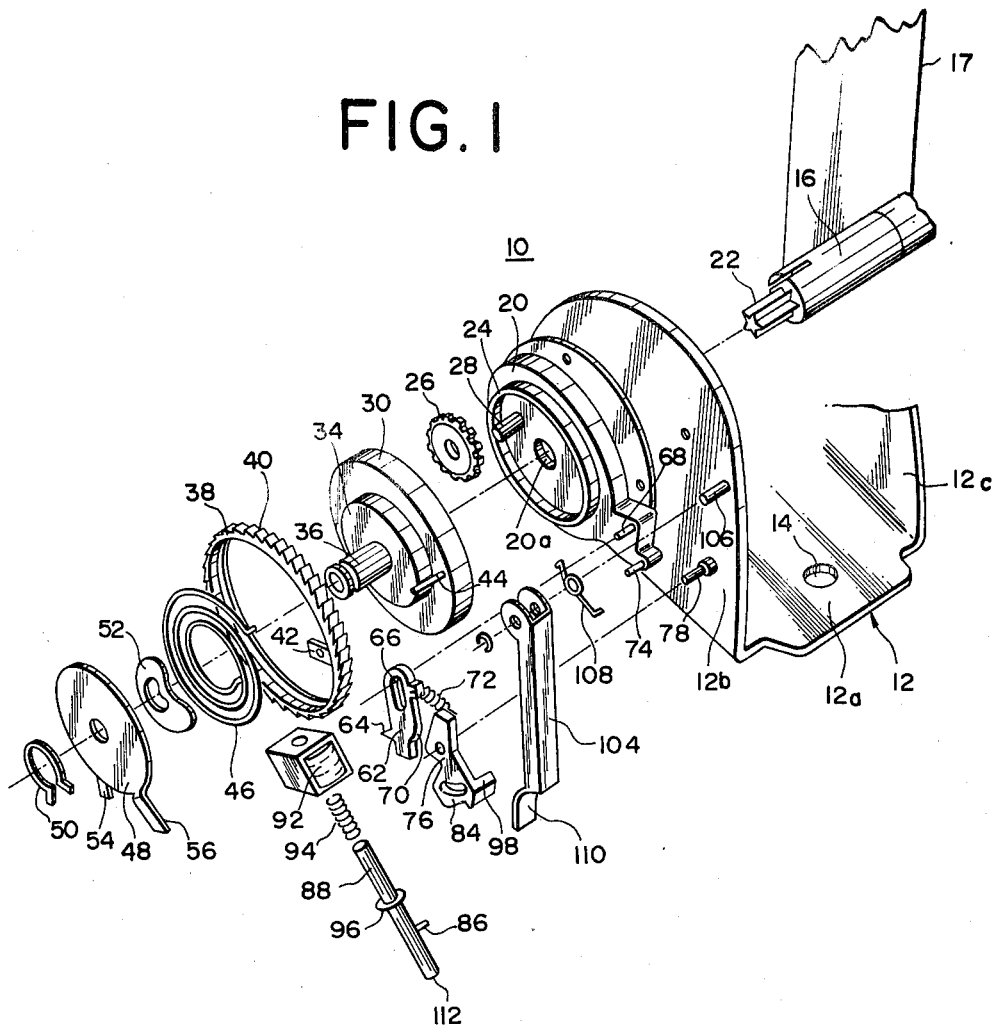
FIG. 1 is an exploded view of essential parts of a seat belt retractor according to the present invention.
Figure 2:
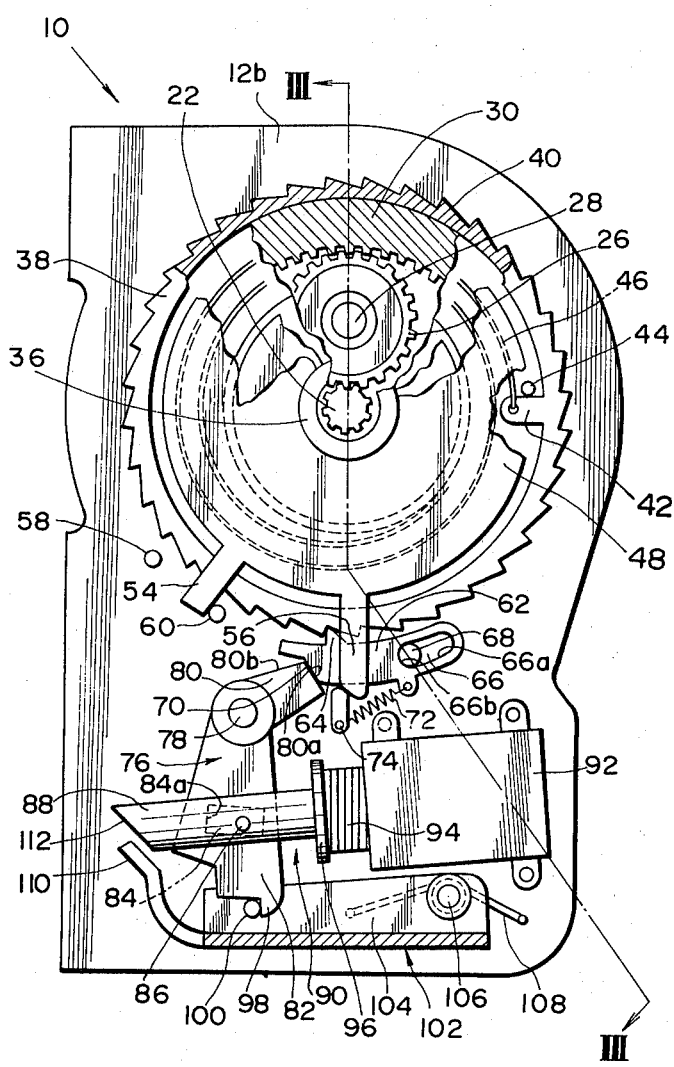
FIG. 2 is a partially broken side view of the seat belt retractor of the present invention, showing a condition wherein the belt memory is established.
Figure 3:
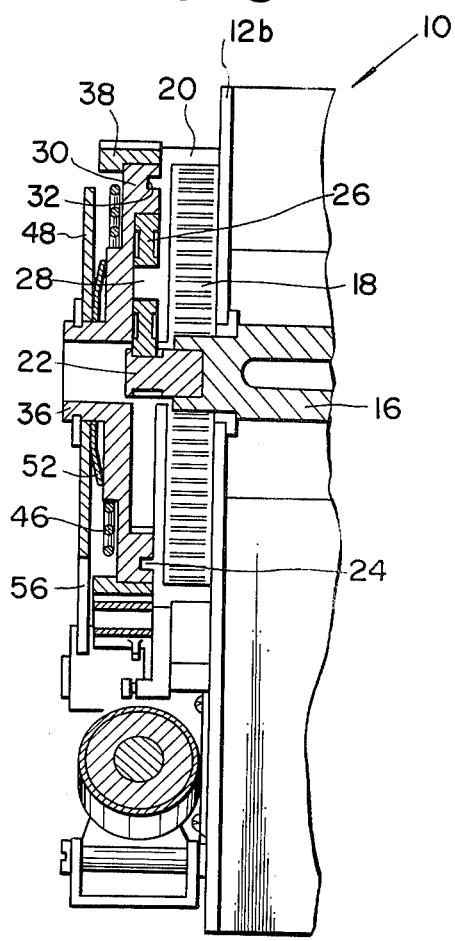
FIG. 3 is a sectional view taken along the line III—III of FIG. 2.

Referring to the drawings, especially FIGS. 1, 2 and 3, there is shown a seat belt retractor according to the present invention, which is generally designated by numeral 10. The retractor 10 comprises a generally U-shaped housing 12 consisting of a base section 12a and a pair of side wall sections 12b and 12c. The housing 12 is adapted to connect to a suitable body portion or a seat portion of a vehicle by a bolt (not shown) which is passed through an opening 14 formed in the base section 12a. A shaft 16 is journaled at both ends in aligned holes respectively formed in the side wall sections 12b and 12c of the housing 12. A seat belt 17 is fastened at one end to the shaft 16 to be wound thereon upon rotation of the shaft 16 in a given direction. As is seen from FIG. 3, a spiral return spring 18 is arranged outside of the side wall section 12b of the housing 12 and housed in a cover 20 secured to the wall section 12b. An inner end of the spring 18 is secured to the shaft 16 and an outer end of same is secured to the cover 20 so that the shaft 16 is biased to rotate in a direction to wind thereon the belt 17, that is in a counterclockwise direction in FIGS. 1 and 2.

Although not shown in the drawings, a conventional emergency locking mechanism is arranged at the outside of the other side wall section 12c of the housing 12. The mechanism may be of any known type which functions to lock the shaft 16 to stop feeding the belt from the shaft 16 when subjected to violent forward movement of the belt wearer, as in a vehicle collision.

A belt tension eliminator which pertains to the present invention will be fully explained hereinnext. As will be understood from FIGS. 1 and 3, the tension eliminator is arranged at the outside of the return spring cover 20 and comprises a pinion 22 which is secured to the end of the shaft 16 so as to project from an opening 20a of the cover 20. For the reason which will become clear hereinafter, a collar member 24 is secured to the cover 20 so as to be concentric with the opening 20a. If desired, the collar member 24 may be integral with the cover 20. The pinion 22 operatively engages a small external gear 26 which is rotatably carried by a stud 28 secured to the cover 20. The external gear 26 in turn engages an internal gear which is integrally formed in a spinning top-shaped member 30. (Hereinafter, the member 30 will be referred to as an internal gear member.) As will be best understood from FIG. 3, the internal gear member 30 is formed at one side of the peripheral portion thereof with a circular groove 32 into which the collar member 24 is slidably received so that the internal gear member 30 is rotatable along the collar member 24, that is about the axis of the shaft 16. The member 30 has at its outer side a smaller diameter raised circular portion 34 and a tubular shaft portion 36 which are concentric with the internal gear formed in the member 30.

An annular ratchet wheel 38 having thereon a plurality of inclined teeth 40 is rotatably disposed about the cylindrical peripheral portion of the internal gear member 30 so as to allow relative rotation therebetween about the axis of the shaft 16. For restricting the relative rotation, the ratchet wheel 3 has an inwardly projecting lug 42 which is to be brought into contact with a stopper pin 44 secured to the internal gear member 30. A spiral spring 46 is disposed about the smaller diameter raised portion 34 with its outer end fastened to the lug 42 and its inner end connected to the internal gear member 30 so that the ratchet wheel 38 and the internal gear member are biased to rotate in opposed directions causing a contact between the lug 42 and the stopper pin 44, that is, the ratchet wheel 38 is biased to rotate in a counterclockwise direction, while, the internal gear member 30 is biased to rotate in a clockwise direction when viewed in FIGS. 1 and 2.

A clutch disc member 48 is movably disposed about the tubular shaft portion 36 of the internal gear member 30, and a fastener 50 is fastened to the leading end of the shaft portion 36 for holding the disc member 48 on the shaft portion 36. A disc spring 52 is compressed between the clutch disc member 48 and the raised circular portion 34 of the internal gear member 30 so that the disc member 48 and the internal gear member 30 rotate together unless one of them is locked against rotation by some means. The disc member 48 has at its periphery first and second outwardly extending arms 54 and 56 which are separate from each other by a given angular distance. For restraining the rotational movement of the disc member 48 in both directions relative to the side wall section 12b of the housing 12, a pair of spaced stopper pins 58 and 60 (see FIG. 2) are mounted on the side wall section 12b so as to place therebetween the first arm 54 of the disc member 48. The second arm 56 functions to control the movement of a stop element 76 which will be described in detail hereinafter.

A pawl member 62 having thereon a detent 64 is arranged beside the ratchet wheel 38 in order to selectively engage and disengage the teeth 40 of the ratchet wheel 38. The pawl member 62 is formed with an elongate slot 66 into which a pin 68 fixed to the cover 20 is loosely received, so that the pawl member 62 is swingable about the pin 68 in a plane perpendicular to the axis of the ratchet wheel 38. For the reason which will become apparent hereinafter, the pawl member 62 is formed with an inclined surface 70 at a side opposite the side on which the detent 64 is formed. The pawl member 62 is biased away from the annular ratchet wheel 38, that is in the direction to disengage the detent 62 of the pawl member 62 out of the teeth 40 of the ratchet wheel 38, by means of a spring 72 which is spanned between the pawl member 62 and a pin 74 secured to the return spring cover 20. The spring 72 is further so arranged that the pawl member 62 is biased to move into a position where the left end 66a (see FIG. 2) of the elongate slot 66 is in contact with the pin 68.

A stop element 76 is generally of wing shape and is pivotally mounted on a stud 78 fixed to the return spring cover 20. As is understood from FIG. 2, one wing 80 of the stop element 76 has not only a flat top 80a which is engageable with the above-mentioned inclined surface 70 of the pawl member 62, but also an upper side 80b which is engageable with the back side of the pawl member 62 as well as the top of the second arm 56 of the disc member 48. As will become clear as the description proceeds, the stop element 76 has first, second and third functional positions. The first position (see FIG. 7) is a position wherein the upper side 80b of the wing 80 is in total engagement with the back side of pawl member 62, bringing the pawl member 62 into meshing engagement with the annular ratchet wheel 38 to lock same against only counterclockwise rotation thereof. The second position (see FIG. 2) is a position wherein the flat top 80a of the wing 80 is in engagement with the inclined surface 70 of the pawl member 62, bringing the pawl member 62 into locking engagement with the ratchet wheel 38 to lock same against both counterclockwise and clockwise rotation thereof. The third position (see FIG. 6) is a position wherein the upper side 80b of the wing 80 is in a point contact with the back side of the pawl member 62, causing the pawl member 62 to be disengaged from the annular ratchet wheel 38 to release same.

The other wing 82 of the stop element 76 is formed with an elongate slot 84 into which a pin 86 fixed to the next-mentioned plunger 88 is loosely inserted.

An electromagnetically operated plunger device 90 is arranged to actuate the stop element 76, which comprises a solenoid 92 secured to the side wall section 12b of the housing 12, a plunger 88 to which the abovementioned pin 86 is fixed, and a coil spring 94 disposed about the plunger 88 and compressed between a spring seat 96 secured to the plunger 88 and the housing of the solenoid 92. With this arrangement, when the solenoid 92 of the device 90 is electrically energized, the plunger 88 moves rightwardly, when viewed in FIG. 2, against the force of the spring 94, rotating the stop element 76 counterclockwise into the first position. When the solenoid 92 is deenergized, the plunger 88 moves leftwardly by the action of the coil spring 94, rotating the stop element 76 clockwise into the third position. The lower end of the wing 82 is formed with a projection 98 which is engageable with a pin 100 of the next-mentioned blocker device 102. As is seen from FIG. 2, the right side edge of the projection 98 is smoothly curved for the reason which will become clear hereinafter.

A blocker device 102 functions to assure the positioning of the stop element 76 at the second position and comprises a channel lever 104 pivotally supported by a stud 106 fixed to the side wall section 12b of the housing 12. The above-mentioned pin 100 is fixed to the lever 104 at a position engageable with the projection 98. A coiled torque spring 108 is disposed at its multi-turn section about the stud 106 with one end hooked to the lever 104 and its other end hooked to the side wall section 12b of the housing 12 so that the lever 104 is biased to swing toward the stop element 76. It should be noted that the pin 100 is caught by the projection 98 only when the stop element 76 assumes the second position.

The blocker device 102 further comprises an extension 110 which extends from the free end of the lever 104 toward the inclined top surface 112 of the plunger 88. The positional relation between the extension 110 and the plunger 88 is that when the plunger 88 moves leftwardly in FIG. 2 for bringing the stop element 76 into the third position (see FIG. 6), the top surface 112 of the plunger 88 collides with the extension 110 and pushes the lever 104 away in the counterclockwise direction in FIG. 2 against the force of the spring 108, thus disengaging the pin 100 from the projection 98 of the stop element 76. It should be noted that the disengagement of the pin 100 from the projection 98 is completed before the pin 86 fixed to the plunger 88 reaches the left end 84a of the elongate slot 84 of the stop element 76.

Figure 4:
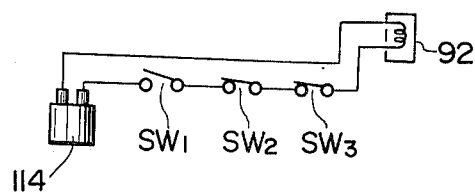
FIG. 4 is an electric circuit for controlling the operation of the seat belt retractor of the present invention.

Referring to FIG. 4, there is shown an electric circuit which controls the operation of the electromagnetically controlled plunger device 90. The circuit comprises a buckle switch SW$_1$, a seat position switch SW$_2$, a backrest position switch SW$_3$, an electric power source 114 and the solenoid 92 of the plunger device 90 which are connected in series as shown.

Figure 5:
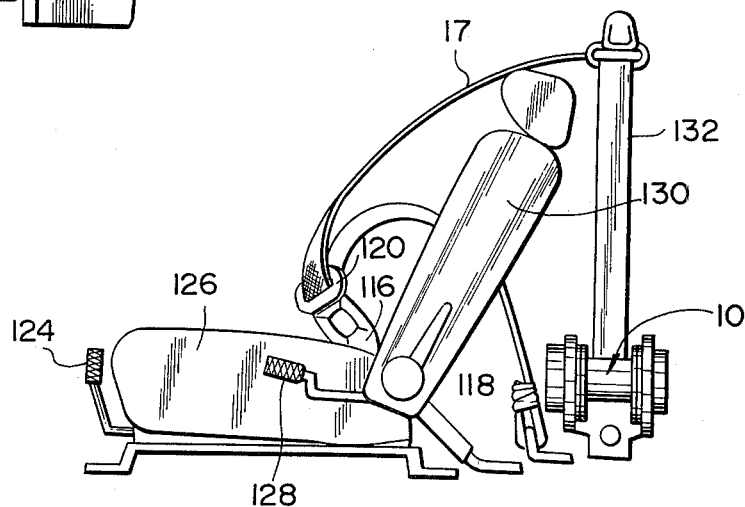
FIG. 5 is a view showing an automotive seat having a seat belt to which the seat belt retractor of the present invention is applied.

As will be understood from FIG. 5, the buckle switch SW$_1$ is, for instance, mounted in a buckle 116 secured to a pivotable arm 118, and functions to close when a tongue member 120 held by the seat belt 17 is coupled with the buckle 116 to allow the seat belt 17 to assume the occupant restraining position. The seat position switch SW$_2$, for example, cooperates with a seat position adjusting lever 124 and functions to close when the lever 124 is in a position to lock the seat 126 at a selected position. The backrest switch SW$_3$, for instance, cooperates with a backrest position adjusting lever 128 and functions to close when the lever 128 is in a position to lock the backrest 130 at a selected position. In FIG. 5, a tubular guide member 132 extends from the retractor 10 and receives therein the belt 122. Under use of the seat belt 122, the tubular guide member 132 is inclined toward the seat 126.)

Operation of the seat belt retractor 10 will be described in the following with reference to FIGS. 2 and 6 to 9.

Figure 6:
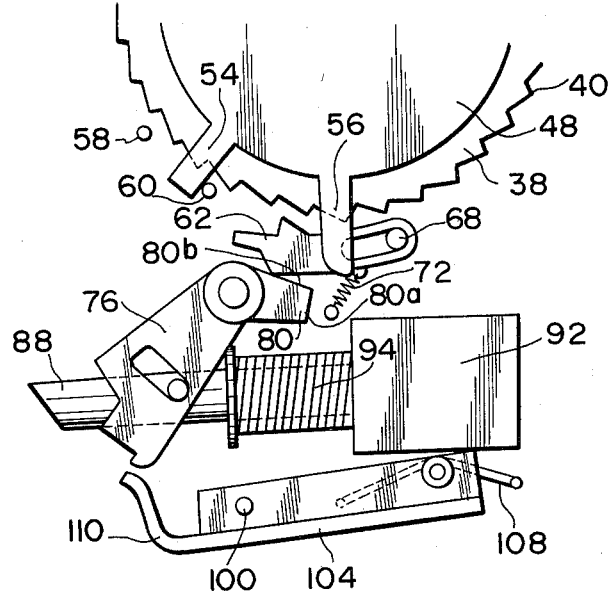
FIGS. 6 to 9 are views depicting in order the operation of the seat belt retractor of the present invention.

For easy understanding of the operation, the explanation of it will commence with respect to a condition wherein the seat position switch SW$_2$ and the backrest position switch SW$_3$ are kept in their close positions and the buckle switch SW$_1$ is open due to disengagement of the tongue member 120 from the buckle 116. In this condition, the solenoid 92 of the plunger device 90 is deenergized, moving the plunger 88 leftwardly to cause the stop element 76 to assume the third position (see FIG. 6). Thus, the pawl member 62 is disengaged from the annular ratchet wheel 38 and assumes its leftmost inoperative position by the action of the spring 72 as is shown by FIG. 6. Thus, the ratchet wheel 38 and the internal gear member 30 are free to rotate together in a clockwise direction by the action of the return spring 18 urging rotation of the belt take up shaft 16 in a counterclockwise direction, that is in the direction to retract the belt 17. By the stopper pin 44 engaging the lug 42, the clockwise rotation of the internal gear member 30 induces simultaneous rotation of the ratchet wheel 38 in the same direction. During the rotation of the internal gear member 30, the clutch disc member 48, which is in frictional contact with the internal gear member 30, rotates therewith until the first arm 54 of the disc member 48 is brought into contact with the stopper pin 58 fixed to the housing 12. It is to be noted that since the frictional force produced by the disc spring 52 is determined to be considerably smaller than the force produced by the return spring 18, the clockwise rotation of the internal gear member 30 which induces the belt retracting rotation of the shaft 16 continues even when the movement of the disc member 48 is inhibited. Therefore, the belt is retracted in the conventional manner.

When the seat occupant intends to wear the seat belt 17, he or she withdraws the retracted seat belt 17. The withdrawl of the belt 17 is made against the force of the return spring 18 by rotating the belt take up shaft 16 in the clockwise direction in FIGS. 1 and 2. This rotation of the shaft 16 brings about the simultaneous but slower counterclockwise rotation of the unit consisting of the internal gear member 30 and the ratchet wheel 38. By the action of the spiral spring 46, the internal gear member 30 and the ratchet wheel 38 rotate as a unit in the same direction. During the counterclockwise rotation of the internal gear member 30, the disc member 48 rotates in the same direction until the first arm 54 thereof is brought into contact with the other stopper pin 60. It is to be noted by the same reason which has been mentioned hereinabove, the counterclockwise rotation of the internal gear member 30 which is induced by the belt drawing rotation of the shaft 16 continues even when the movement of the disc member 48 is inhibited.

Figure 7:
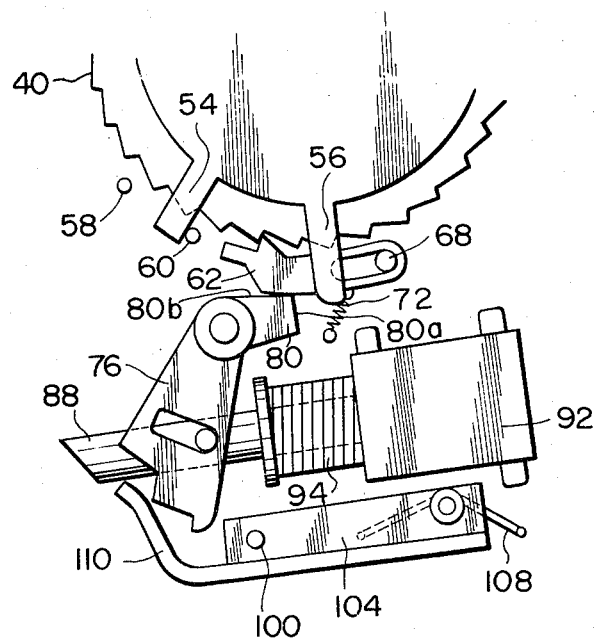
Figure 8:
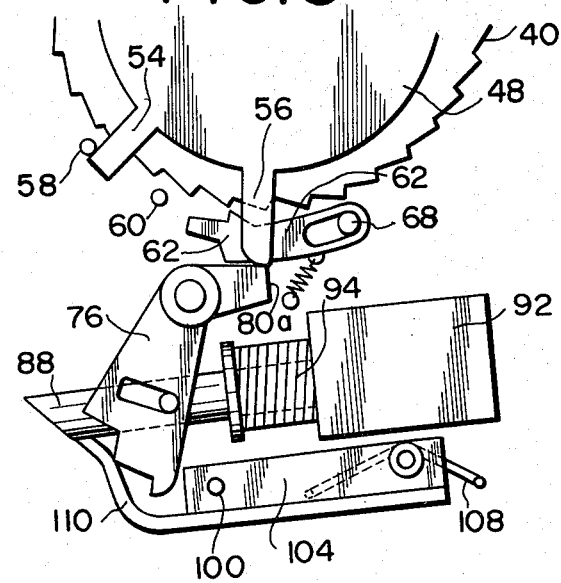
Figure 9:
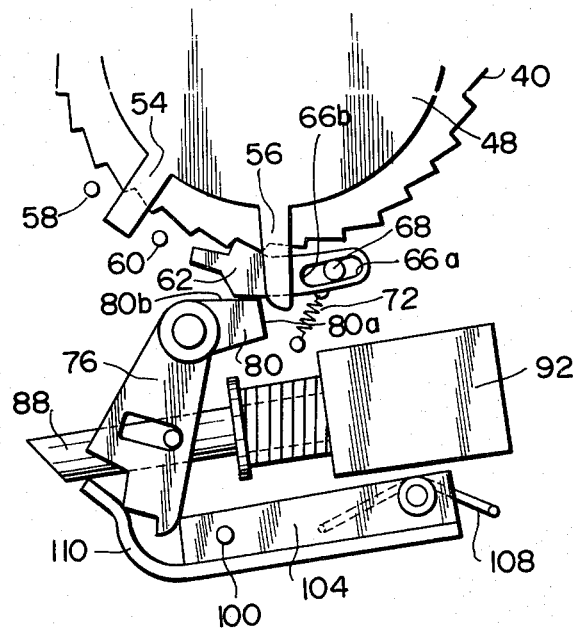

When the buckle 116 and the tongue member 120 of the seat belt 17 are engaged, the buckle switch SW$_1$ closes, thereby energizing the solenoid 92 of the electromagnetically operated plunger device 90. Thus, the plunger 88 moves rightward against the force of the spring 94, thereby moving the stop element 76 into the first position (FIG. 7). (It is to be noted that the rightward movement of the plunger 88 reaches only halfway, thereby keeping the plunger 88 biased rightwardly.) Thus, the pawl member 62 is brought into meshing engagement with the teeth 40 of the ratchet wheel 38. This engagement is made by contacting the upper side 80b of the wing 80 of the stop element 76 with the back side of the pawl member 62 as is seen from FIG. 7. It should be noted that by the nature of the ratchet wheel 38 having the inclined teeth 40, clockwise rotation of the ratchet wheel 38 is permitted even when the pawl member 62 is in engagement with the teeth of the ratchet wheel 38. Thus, upon releasing the coupled unit of the buckle 116 and the tongue member 120 from the belt wearer's hands, the seat belt 17 is retracted by the shaft 16 by the action of the return spring 18 to such an extent that the belt wearer is tightly restrained by the belt 17 with a certain pressure exerted on the body of the wearer. By the clockwise rotation of the internal gear member 30, the disc member 48 moves in the same direction until the first arm 54 is brought into contact with the stopper pin 58, as is seen from FIG. 8. During the movement of the first arm 54 from the stopper pin 60 to the other stopper pin 58, the end of the second arm 56 of the disc member 48 is brought into contact with the upper side 80b of the wing 80 of the stop element 76 and pushes the wing 80 downwardly (clockwise) to achieve complete disengagement between the pawl member 62 and the ratchet wheel 38, as will be understood from FIG. 8. Thus, it will be appreciated that after the complete disengagement between the pawl member 62 and the ratchet wheel 38, the belt retracting motion of the retractor 10 is made without producing a ratchet noise.

When the belt 17 is withdrawn a predetermined short length (which is usually about 30 mm and provides a slack to the belt at the memory position of the belt 17 as will become clear hereinafter), the internal gear member 30 and the annular ratchet wheel 38 rotate as a unit in the counterclockwise direction. But, this joint rotation ceases when the second arm 56 of the disc member 48 which rotates with them is disengaged from the wing 80. Upon disengagement of the second arm 56 from the wing 80, the wing 80 presses the pawl member 62 against the annular ratchet wheel 38, bringing the pawl member 62 into meshing engagement with the ratchet wheel 38, as is seen from FIG. 9. After engagement of the pawl member 62 with the ratchet wheel 38, the rotating ratchet wheel moves the pawl member 62 rightward against the force of the spring 72 until the left end 66b of the elongate opening 66 of the pawl member 62 is brought into contact with the pin 68. Upon arrival of the left end 66b of the elongate opening 66 at the pin 68, the flat top 80a of the wing 80 slides against the inclined surface 70 of the pawl member 62 (see FIG. 2) and at the same time, the projection 98 formed on the other wing 82 engages the pin 100 of the blocker device 102 to push the lever 104 downwardly (counterclockwise) against the force of the spring 108. This movement is achieved by the rightwardly biasing force remaining in the plunger 88, so that upon completion of the movement, plunger 88 assumes its rightmost position as is seen from FIG. 2. Thus, the annular ratchet wheel 38 is now locked against not only counterclockwise rotation but also clockwise rotation. With the ratchet wheel 38 completely locked against clockwise rotation, the clockwise rotation of the internal gear member 30 which would induce the belt retracting motion of the shaft 16 is inhibited by the engagement beetweem the stopper pin 44 of the internal gear member 30 and the lug 42 of the annular ratchet wheel 38. Thus, in this condition as shown in FIG. 2, the belt retracting rotation of the shaft 16 is no longer carried out, and a so-called "memory" position of the seat belt 17 is not established. The seat belt 17 assumes the occupant restraining position with a slack thereof which alleviates the belt wearer's sensation of tension or restrain.

When the belt wearer inclines slowly forward for handling, for instance, a glove box, further withdrawal of the seat belt 17 beyond the memory position is available in the manner as follows. When the seat belt 17 is urged to be withdrawn from the retractor 10, the belt take up shaft 16 is rotated in the clockwise direction, rotating the internal gear member 30 in the counterclockwise direction against the forces produced by the spiral spring 46 and the return spring 18. Further withdrawal of the belt 17 continues until the stopper pin 44 moving counterclockwise with the internal gear member 30 is brought into contact with the rear side of the lug 42 of the annular rachet wheel 38, which is completely locked. When the belt wearer returns to his original seating position, the springs 18 and 46 retract the belt 17, rotating the internal gear member 30 in the clockwise direction. This belt retracting action continues until the stopper pin 44 of the internal gear member 30 is brought into contact with the front side of the lug 42 of the annular ratchet wheel 38. Thus, it will be appreciated that the seat belt position now established is the afore-mentioned memory position.

When the buckle 116 and the tongue member 120 are uncoupled for releasing the occupant from the seat belt 17, the buckle switch $SW_1$ opens, causing deenergization of the solenoid 92 of the electromagnetically operated plunger device 90. Thus, the plunger 88 of the device 90 is moved leftward in FIG. 2 by the action of the spring 94. During the leftward movement of the plunger 88, the inclined top end of the plunger 88 collides against the extension 110 of the lever 104 to push the lever 104 downwardly against the force of the spring 108, thereby disengaging the pin 100 of the lever 104 from the projection 98 of the stop element 76, and thereafter, the pin 86 of the plunger 88 collides against the left end 84a of the elongate slot 84 of the stop element 76 to rotate the stop element 76 into the second position. With this movement, the pawl member 62 is disengaged from the teeth of the annular ratchet wheel 38, and by the action of the spring 72, the pawl member 62 moves leftward keeping disengagement from the ratchet wheel 38 as is shown in FIG. 6. Thus, the belt retracting motion of the shaft 16 takes place by the return spring 18.

What is claimed is:

1. A seat belt retractor having a tension eliminator comprising:
   (a) a housing;
   (b) a belt take up shaft supported for rotation about its axis by said housing, said shaft having said seat belt connected thereto and wound thereon within said housing;
   (c) first biasing means for biasing said shaft to rotate in one direction to cause said belt to be retracted into said housing by being wound onto said shaft, and to permit said shaft to rotate in the opposite direction when said belt is extended from said housing;
   (d) a pinion gear carried by said shaft for rotation therewith about said axis;
   (e) an internal gear rotatable about said axis;
   (f) an idler gear in meshed relationship with and establishing a drive connection between said pinion gear and said internal gear;
   (g) a ratchet wheel rotatable about said axis, said ratchet wheel having external teeth;
   (h) stop members located respectively on said ratchet wheel and said internal gear;
   (i) second biasing means for interconnecting said ratchet wheel and said internal gear and for biasing the same for rotation in opposite directions about said axis, the said rotation in opposite directions of said internal gear and ratchet wheel being limited by the mutual engagement of said stop members;
   (j) a clutch disc rotatable about said axis, said clutch disc being in frictional contact with said internal gear;
   (k) a pawl member located proximately to the external teeth of said ratchet wheel;
   (l) a stop element engageable with said pawl member, said stop element being adjustable between:
      (i) a third position at which said pawl member is disengaged from the external teeth of said ratachet wheel, thereby freeing said ratchet wheel for rotation in either direction;
      (ii) a second position at which said pawl member is engaged with the external teeth of said ratchet wheel in a manner such as to prevent said ratchet wheel from rotation in either direction; and (iii) a first position at which said pawl member is engaged with the external teeth of said ratchet wheel in a manner such as to allow said ratchet wheel to rotate in response to a retraction of said belt, the said pawl member being movable bodily from said first position through a limited distance to said second position to thereby accommodate limited rotation of said ratchet wheel in response to an extension of said belt;

(m) an electromagnetically operated plunger device for adjusting said stop element between said first, second and third positions; and (n) a projection on said clutch disc arranged to engage said stop element during retraction of said belt to adjust said stop element to a position allowing said pawl member to disengage from the external teeth of said ratchet wheel.

2. A seat belt retractor as claimed in claim 1, in which said second biasing means comprises a spiral spring which has an outer end connected to said annular ratchet wheel and an inner end connected to said internal gear.

3. A seat belt retractor as claimed in claim 1, in which said pawl member is pivotally arranged beside said ratchet wheel and biased by a spring to swing in a direction to meshingly engage the teeth of said rachet wheel, said pawl member being formed with an elongate opening through which a pin fixed to said housing passes so that said pawl member is movable in a plane perpendicular to the rotation axis of said ratchet wheel and is biased to move in one direction by said spring;

said stop element being swingably mounted and having first and second wings, said stop element when in said first position having a side of said first wing in total engagement with a back side of said pawl member bringing said pawl member into meshing engagement with the teeth of said ratchet wheel to lock same against rotation in only one direction, said second position being a position wherein a flat top of said first wing is in engagement with an inclined flat surface of said pawl member bringing said pawl member into meshing engagement with the teeth of said ratchet wheel to lock same against rotation in both directions, and said third position being a position wherein said side of said first wing is in point contact with the back side of said pawl member disengaging said pawl member from the teeth of said ratchet wheel to release same;

said electromagnetically operated plunger device causing said stop element to take said first position when electrically energized and to take and third position when deenergized; and a blocker device which assures the positioning of said stop element at said second position.

4. A seat belt retractor as claimed in claim 3, in which said electromagnetically operated plunger device is connected to said second wing through a lost motion mechanism which comprises a pin fixed to a plunger of said plunger device, and an elongate opening formed in said second wing, said pin being loosely received in said elongate opening.

5. A seat belt retractor as claimed in claim 4, in which said blocker device comprises:

a projection formed on said second wing of said stop element;

a lever having a pin thereon, said lever being swingably mounted and biased by a spring to swing toward said stop element so that when said stop element changes its position from said first position to said second position, said projection gets over said pin by pushing said lever away against the force of said spring and thereafter said projection catches said pin to lock said stop element against the movement of said stop element from said second position to said third position, an extension of said lever, the positional relation between said extension and said plunger of said plunger device being so made that when said plunger moves to cause said stop element to take said third position, said plunger pushes said extension to cause disengagement between said projection of said second wing and said pin of the lever.

* * * * *